United States Patent
Cariss

(10) Patent No.: US 10,201,857 B2
(45) Date of Patent: Feb. 12, 2019

(54) TOOL HOLDER ASSEMBLIES AND METHODS OF USING THE SAME

(71) Applicant: Kennametal Inc., Latrobe, PA (US)

(72) Inventor: Lance Cariss, Export, PA (US)

(73) Assignee: KENNAMETAL INC., Latrobe, PA (US)

( * ) Notice: Subject to any disclaimer, the term of this patent is extended or adjusted under 35 U.S.C. 154(b) by 511 days.

(21) Appl. No.: 14/820,827

(22) Filed: Aug. 7, 2015

(65) Prior Publication Data

US 2017/0036276 A1    Feb. 9, 2017

(51) Int. Cl.
| B23B 31/107 | (2006.01) |
| B23B 31/26 | (2006.01) |
| B23B 29/04 | (2006.01) |

(52) U.S. Cl.
CPC ........ B23B 31/1071 (2013.01); B23B 29/046 (2013.01); B23B 31/263 (2013.01); B23B 2260/034 (2013.01); B23B 2260/136 (2013.01); B23B 2270/025 (2013.01); Y10T 279/1045 (2015.01); Y10T 279/1091 (2015.01)

(58) Field of Classification Search
CPC ............. B23B 31/1071; B23B 31/263; B23B 2260/136; B23B 2270/025; Y10T 279/1033; Y10T 279/1037; Y10T 279/1045; Y10T 279/1091; Y10T 409/309464

See application file for complete search history.

(56) References Cited

U.S. PATENT DOCUMENTS

| 5,626,448 A * | 5/1997 | Huang .................. B23B 31/263 409/230 |
| 6,238,152 B1* | 5/2001 | Fujimoto .............. B23B 31/261 408/239 A |
| 9,527,139 B2* | 12/2016 | Mellstrom .............. B23B 31/24 |
| 2009/0270020 A1* | 10/2009 | Klein ...................... B24B 33/02 451/541 |
| 2010/0196113 A1* | 8/2010 | Erickson ................. B23B 31/06 408/239 R |
| 2016/0052063 A1* | 2/2016 | Englund ............. B23B 31/4033 279/2.1 |

FOREIGN PATENT DOCUMENTS

| DE | 102004015594 A1 * | 10/2004 | ............. B23B 31/02 |
| EP | 2272625 A2 * | 1/2011 | ....... B23B 31/16287 |
| FR | 2087257 A5 * | 12/1971 | ............. B23B 31/26 |

* cited by examiner

*Primary Examiner* — Eric A Gates
*Assistant Examiner* — Chwen-Wei Su
(74) *Attorney, Agent, or Firm* — Matthew S. Bedsole

(57) ABSTRACT

In one aspect tool holder assemblies are described herein. Such tool holder assemblies can employ outer and inner spring-like members. For example, a tool holder assembly described herein comprises a drawbar having an outer diameter surface and an inner diameter surface defining an interior of the drawbar. The drawbar is movable or actuatable along a longitudinal axis between a locked position and an unlocked position. The tool holder assembly can further comprise a first spring-like member positioned around the outer diameter surface of the drawbar and a second spring-like member positioned in the drawbar interior.

6 Claims, 3 Drawing Sheets

TOOL HOLDER ASSEMBLIES AND METHODS OF USING THE SAME

FIELD

The present invention relates to tool holder assemblies and, in particular, to tool holder assemblies employing outer and inner spring-like members.

BACKGROUND

Tool coupling systems and spindle connector assemblies configured for use with interchangeable cutting or machining tools provide a number of process efficiencies. A smaller number of machine spindles can be used for a larger variety of machine operations, and downtime between various cutting tasks can be reduced by decreased need to switch apparatus for each machining application. In order to realize the foregoing efficiencies, tool holder assemblies and spindle connector assemblies must be capable of secure connection with minimal tool change downtime and reduced operator effort to secure the tool head. As tool diameter increases, the architecture necessary to maintain a secure connection with minimal tool change downtime often results in a greatly increased machine footprint. Such disadvantages can be difficult to address, either singly or in tandem. Therefore, there exists a need for improved tool holder assemblies and methods of using the same.

SUMMARY

In one aspect, tool holder assemblies are described herein. Such tool holder assemblies can employ outer and inner spring-like members. For example, a tool holder assembly described herein comprises a drawbar having an outer diameter surface and an inner diameter surface defining an interior of the drawbar. The drawbar is actuatable along a longitudinal axis between a locked position and an unlocked position. A first spring-like member is positioned around the outer diameter surface of the drawbar and a second spring-like member is positioned in the drawbar interior.

In another aspect, methods of clamping and/or unclamping a tool into a tool holder assembly having a drawbar are described herein. In some embodiments, a method comprises actuating the drawbar along a longitudinal axis between a locked position and an unlocked position. The drawbar comprises an outer diameter surface and an inner diameter surface defining an interior of the drawbar. Actuating the drawbar towards the unlocked position compresses first and second spring-like members. The first spring-like member can be positioned around the outer diameter surface of the drawbar, and the second spring-like member can be positioned in the drawbar interior.

These and other embodiments are described in further detail in the detailed description which follows.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Tool Holder Assemblies Employing Outer and Inner Spring-like Members

Figure 1:
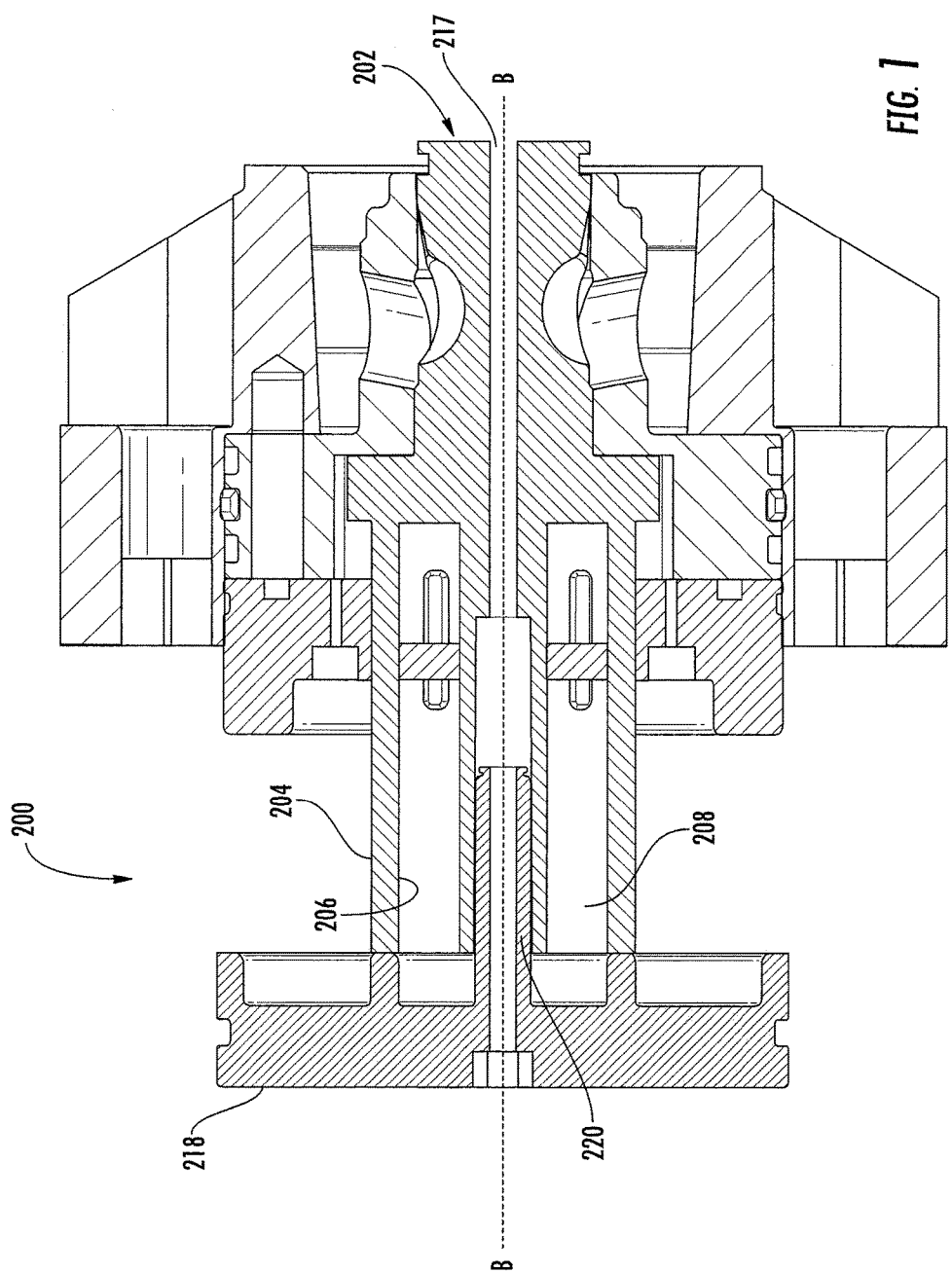
FIG. 1 illustrates a cross-sectional view of a tool holder assembly according to one embodiment described herein.

In one aspect, tool holder assemblies are described herein employing outer and inner spring-like members. Referring now to FIG. 1, there is illustrated a tool holder assembly, generally designated as reference 200, in accordance with one embodiment described herein. As provided in FIG. 1, the tool holder assembly (200) comprises a drawbar (202) having an outer diameter surface (204) and an inner diameter surface (206) defining an interior (208) of the drawbar (202). The drawbar (202) is movable or actuatable along a longitudinal axis (B-B) between a locked position and an unlocked position. A first spring-like member (not shown) can be positioned around the outer diameter surface (204) of the drawbar (202), and a second spring-like member (not shown) can be positioned in the drawbar interior (208).

Figure 2:
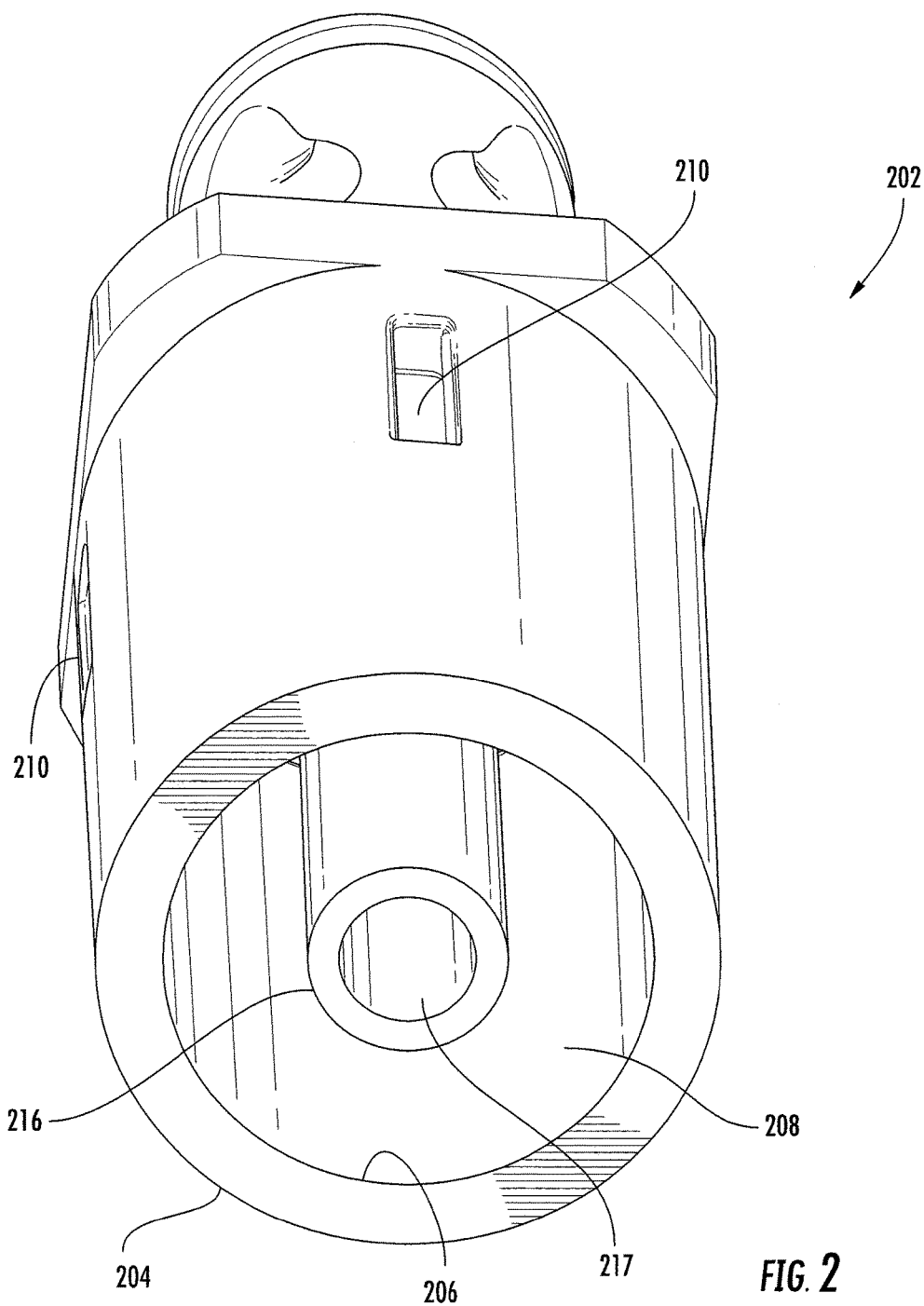
FIG. 2 illustrates a perspective view of a drawbar according to one embodiment of a tool holder assembly described herein.

A drawbar (202) can be generally configured to be movable between a locked position and an unlocked position. The drawbar (202) can be configured to apply axial force substantially parallel to the longitudinal axis (B-B). Additionally, the drawbar (202) can be configured to actuate one or more locking members, as in the embodiment illustrated in FIG. 1, to engage a radial locking configuration. Referring now to FIG. 2, the drawbar (202) has an outer diameter surface (204) and an open or hollow inner diameter surface (206). The inner diameter surface (206) defines an interior (208) of the drawbar (202). In the embodiment illustrated in FIG. 2, the drawbar (202) includes a plurality of slots (210) in the outer diameter surface (204). In some cases, the plurality of slots (210) are in communication with the inner diameter surface (206) such that the slots (210) pass from the outer diameter surface (204) to the drawbar interior (208). In such configurations, the drawbar (202) can be configured to work in communication with a canister plate (212), as described further herein below. In some embodiments, the drawbar (202) further includes a rod (216) disposed in the drawbar interior (208).

Referring to FIG. 1, an end plate (218) used in a tool holder assembly (200) described herein can have any configuration or architecture not inconsistent with the objectives of the present invention. An end plate (218) can be sized to engage a recess (see FIG. 1) in the tool holder case (see FIG. 1). In certain other cases, the end plate (218) is movable or actuatable between a locked position and an unlocked position. Such movement or actuation can be accomplished by any manner or means, including by application of hydraulic pressure. Use of hydraulic pressure is described in connection with FIGS. 1 and 2 herein. Movement or actuation of the end plate (218) towards or into the unlocked position can compress the first and/or second spring-like members against the end plate. Relatedly, movement or actuation of the end plate (218) towards the locked position decompresses the first and/or second spring-like elements.

Figure 3:
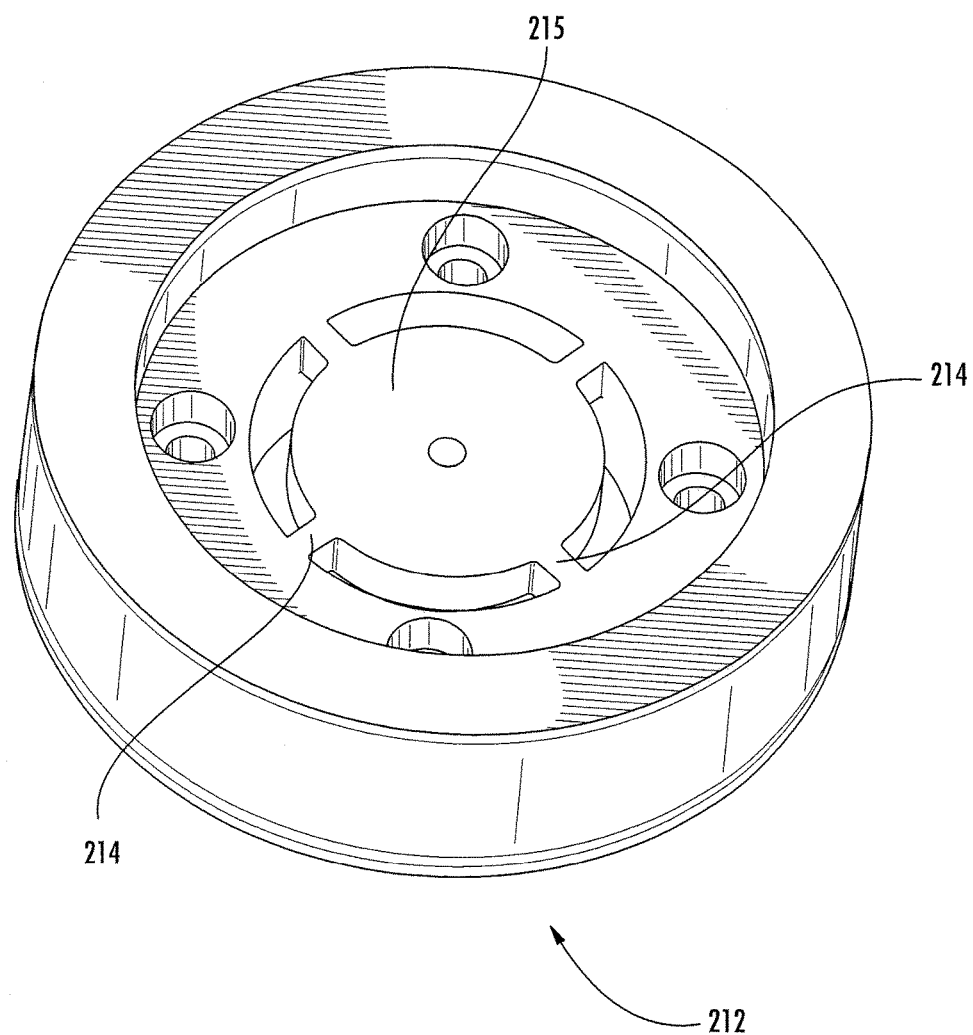
FIG. 3 illustrates a perspective view of a canister plate according to one embodiment of a tool holder assembly described herein.

Further, a canister plate (212) used in some embodiments of a tool holder assembly (200) described herein can have any configuration or architecture not inconsistent with the objectives of the present invention. One embodiment of a canister plate (212) is illustrated in FIG. 3. In the embodiment of FIG. 3, the canister plate (212) comprises a plurality of projections (214). In some embodiments, the projections (214) can be connected to or affixed to a base plate (215). However, in certain other embodiments, the canister plate (212) does not include a base plate (215). The projections (214) can be sized, shaped or otherwise configured to engage or communicate with the slots (210 in FIG. 2) of the drawbar. In this configuration, the projections (214) can engage the second spring-like member such that the second spring-like member of the drawbar interior for compression against the projections (214) to provide a biasing force. In embodiments having a base plate (215), the projections (214) can be affixed or, in some cases, integrally formed with the base plate (215). In such cases, the base plate (215) can be used as a further support surface for contacting the second spring-like member.

A tool holder assembly (200), in some embodiments, further comprises a first spring-like member (not shown) positioned around the outer diameter surface (204) of the drawbar (202) and a second spring-like member (not shown) positioned in the drawbar interior (208). In embodiments comprising a drawbar (214) including a rod (216) positioned in the drawbar interior (208), the second spring-like member can be disposed around the rod (216). Any spring-like members can be used not inconsistent with the objectives of the present invention. First and/or second spring-like members can comprise a plurality of disc springs configured to provide biasing force in an axial direction substantially parallel to the longitudinal axis (B-B) to bias the drawbar (202) in either the locked or unlocked position. In some cases, for example, moving or actuating the drawbar (202) towards the unlocked position compresses the first spring-like member and/or the second spring-like member. In such embodiments, compressing the first-spring like member can include compressing the first spring-like member against the canister plate (212) around the outer diameter surface (204). Further, compressing the second spring-like member can include compressing the second spring-like member against the projections (214) and/or the base plate (215) of the canister plate (212). In such cases, moving or actuating the drawbar (202) into the locked position can decompress the first and/or second spring-like elements.

II. Methods of Clamping and/or Unclamping

In another aspect, methods of clamping and/or unclamping a tool into a tool holder assembly having a drawbar are described herein. In some embodiments, a method comprises actuating the drawbar along a longitudinal axis between a locked position and an unlocked position. The drawbar can have an outer diameter surface and an inner diameter surface defining an interior of the drawbar. Actuating the drawbar towards the unlocked position can compress first and second spring-like members. The first spring-like member can be positioned around the outer diameter surface of the drawbar, and the second spring-like member can be positioned in the drawbar interior. The tool holder assembly, drawbar, first and second spring-like members and associated parts/components can have any constructions and/or properties described in Section I above.

Specific steps of tool clamping can be carried out in any order or in any manner not inconsistent with the objectives of the present invention. For example, actuating the drawbar can be performed in any manner. In some embodiments, actuating the drawbar is performed by application of hydraulic pressure. In certain other embodiments, the drawbar can be actuated by other means, such as by rotation of a cam bolt or cam shaft to rotate a follower into engagement with the drawbar in order to effectuate movement or actuation. In some cases, actuating the drawbar towards the unlocked position can be carried out in a manner wherein the second-spring-like member is compressed against the projections of the canister plate in the interior of the drawbar and/or such that the first spring-like member is compressed against the canister plate around the outer diameter of the drawbar. Moreover, actuating the drawbar can be performed in a manner such that actuating the drawbar towards the locked position decompresses the first and/or second spring-like elements.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A tool holder assembly comprising:
   a drawbar having an outer diameter surface and an inner diameter surface defining an interior of the drawbar, the drawbar being actuatable along a longitudinal axis between a locked position and an unlocked position, and the outer diameter surface having a plurality of slots disposed therein;
   a first spring-like member positioned around the outer diameter surface of the drawbar and a second spring-like member positioned in the drawbar interior;
   an end plate, wherein actuating the drawbar towards the unlocked position compresses the first and second spring-like members against the end plate; and
   a canister plate having a plurality of projections for engaging the slots in the outer diameter surface.

2. The tool holder assembly of claim 1, wherein actuating the drawbar towards the unlocked position compresses the second spring-like member against the projections on the interior of the drawbar.

3. The tool holder assembly of claim 1, wherein actuating the drawbar towards the unlocked position compresses the first spring-like member against the canister plate around the diameter surface.

4. The tool holder assembly of claim 1, wherein the drawbar further comprises a rod positioned in the drawbar interior.

5. The tool holder assembly of claim 4, wherein the second spring-like member is disposed around the rod.

6. The tool holder of claim 1, wherein the drawbar is hydraulically actuatable.

\* \* \* \* \*